US008693291B2

(12) United States Patent
Umamoto

(10) Patent No.: US 8,693,291 B2
(45) Date of Patent: Apr. 8, 2014

(54) CLOCK WITH A CLOCK FACE FOR INDICATING TIME HAVING NEARLY FULL-SCREEN DISPLAY FUNCTION

(75) Inventor: Eiichi Umamoto, Tokyo (JP)

(73) Assignee: Nihon Techno Co., Ltd., Shinjuku-Ku (JP)

( * ) Notice: Subject to any disclaimer, the term of this patent is extended or adjusted under 35 U.S.C. 154(b) by 0 days.

(21) Appl. No.: 13/320,625

(22) PCT Filed: Dec. 10, 2010

(86) PCT No.: PCT/JP2010/072270
§ 371 (c)(1),
(2), (4) Date: Nov. 15, 2011

(87) PCT Pub. No.: WO2012/014340
PCT Pub. Date: Feb. 2, 2012

(65) Prior Publication Data
US 2013/0121119 A1 May 16, 2013

(30) Foreign Application Priority Data

Jul. 30, 2010 (JP) ................................. 2010-172907

(51) Int. Cl.
*G04C 17/00* (2006.01)
*G04C 19/00* (2006.01)
(52) U.S. Cl.
USPC ............................................ 368/82; 368/239
(58) Field of Classification Search
USPC ..................... 368/239–244, 82–84
See application file for complete search history.

(56) References Cited

U.S. PATENT DOCUMENTS 372,074 A * 10/1887 Kuhn ............................. 368/229
5,458,342 A * 10/1995 Hernandez ..................... 273/447

(Continued)

FOREIGN PATENT DOCUMENTS

JP 53-093051 8/1978
JP 55-146200 10/1980

(Continued)

OTHER PUBLICATIONS

Character—dictionary.com; Aug. 28, 2013.*
Japanese Office action for JP2010-172907: Sep. 6, 2010.

*Primary Examiner* — Sean Kayes
(74) *Attorney, Agent, or Firm* — Pearne & Gordon LLP

(57) ABSTRACT

In the conventional clock, it is difficult to instantly grasp the additional information upon looking at the time and the information is not efficiently utilized. The clock is not popular among people of all ages.
In order to solve the above deficiencies, we provide a clock which comprises a clock face for indicating time, having a nearly full-screen display function and an outline appearing to be a face, a storage for facial expression information, storing a plurality of facial expression information displayable on the display, an acquisition unit for external information, acquiring external information, a storage for correspondence information, storing correspondence information for correlating the external information with the facial expression information, and a clock face controller, acquiring the facial expression information to be displayed on the display from the storage for facial expression information by utilizing the external information and the correspondence information, and displaying the information on the display.

9 Claims, 21 Drawing Sheets

(56) References Cited

U.S. PATENT DOCUMENTS

| | | | |
|---|---|---|---|
| 5,872,746 A * | 2/1999 | Reiner et al. | 368/223 |
| 6,449,219 B1 * | 9/2002 | Hepp et al. | 368/16 |
| 6,589,058 B2 * | 7/2003 | Brooks | 434/365 |
| 6,836,450 B2 * | 12/2004 | Gilbert | 368/223 |
| D578,031 S * | 10/2008 | Holmes et al. | D10/126 |
| D606,199 S * | 12/2009 | Vu et al. | D24/177 |
| 7,683,763 B2 * | 3/2010 | Nelson | 340/309.16 |
| 8,018,327 B2 * | 9/2011 | Nelson | 340/309.16 |
| 8,295,130 B2 * | 10/2012 | Claessens | 368/73 |

FOREIGN PATENT DOCUMENTS

| | | |
|---|---|---|
| JP | 05-057692 U | 7/1993 |
| JP | 08-226982 A | 9/1996 |
| JP | 11-166984 A | 6/1999 |
| JP | 2005-218779 | 8/2005 |
| JP | 2009-085935 A | 4/2009 |
| JP | 2009-187057 | 8/2009 |
| JP | 2010-140366 | 6/2010 |

* cited by examiner

Fig3
| Temperature (Degrees C) | Facial expression information (identifier) | Facial expression information (detail) |
|---|---|---|
| Above 40 degrees C | F01 | 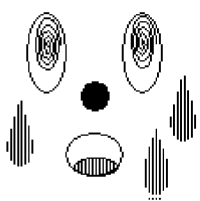 |
| 30~40 degrees C | F02 | 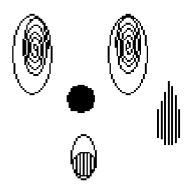 |
| 15~30 degrees C | F03 |  |
| 0~15 degrees C | F04 | 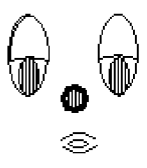 |
| Below 0 degrees C | F05 |  |

Fig4

| External information | Type: Position (X, Y) | | | |
|---|---|---|---|---|
| | Left eye | Right eye | Nose | Additional features |
| IN1 | LE1:($X_{LE1}$,$Y_{LE1}$) | RE1:($X_{RE1}$,$Y_{RE1}$) | N1:($X_{N1}$,$Y_{N1}$) | NODATA |
| IN2 | LE2:($X_{LE2}$,$Y_{LE2}$) | RE2:($X_{RE2}$,$Y_{RE2}$) | N2:($X_{N2}$,$Y_{N2}$) | P2:($X_{P2}$,$Y_{P2}$) |
| IN3 | LE3:($X_{LE3}$,$Y_{LE3}$) | RE3:($X_{RE3}$,$Y_{RE3}$) | N3:($X_{N3}$,$Y_{N3}$) | P3:($X_{P3}$,$Y_{P3}$) |
| ⋮ | ⋮ | ⋮ | ⋮ | ⋮ |

Fig5
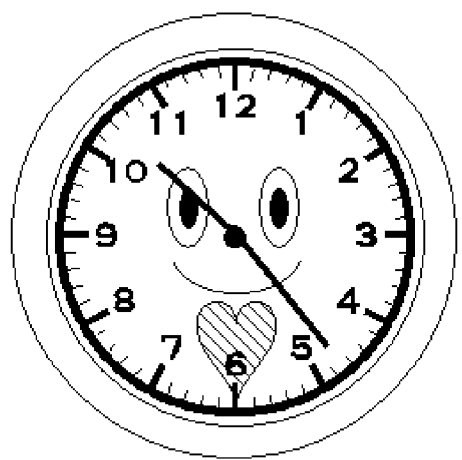
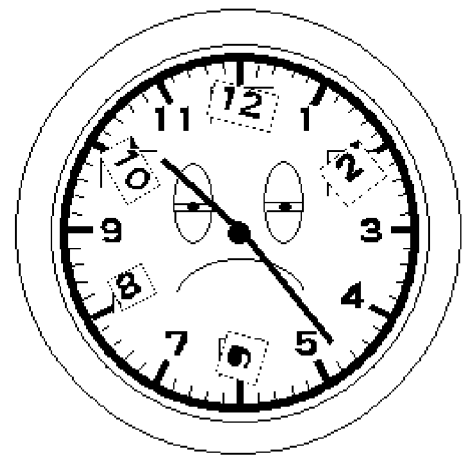

Fig9
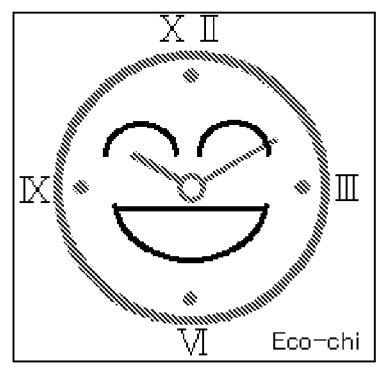
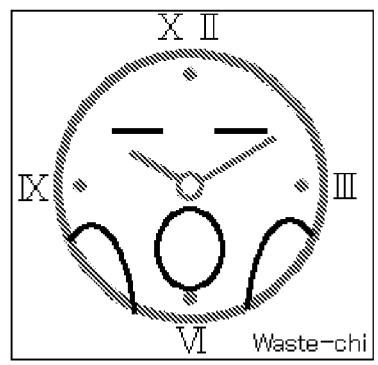

Fig 11

| Comparative calculation result | Facial expression information (identifier) | Facial expression information (detail) |
|---|---|---|
| Above 1.5 | F11 | |
| 1~1.5 | F12 | |
| Below 1 | F13 | |

Fig. 13
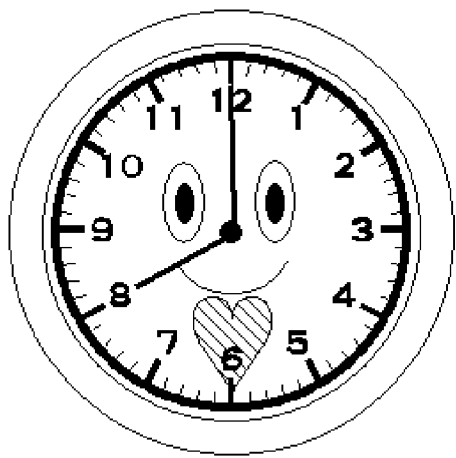
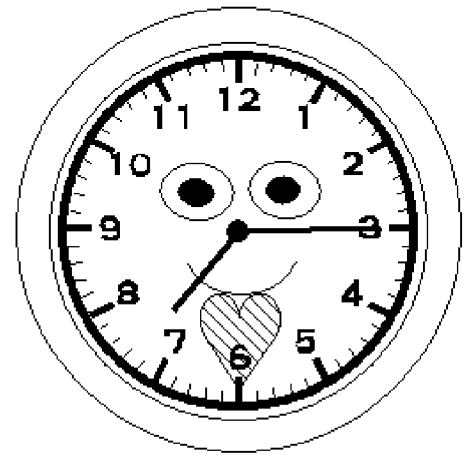
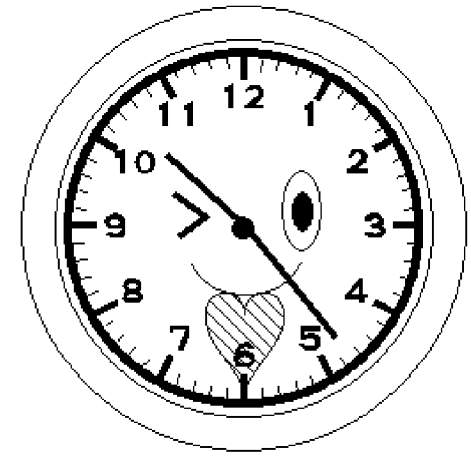

Fig. 16
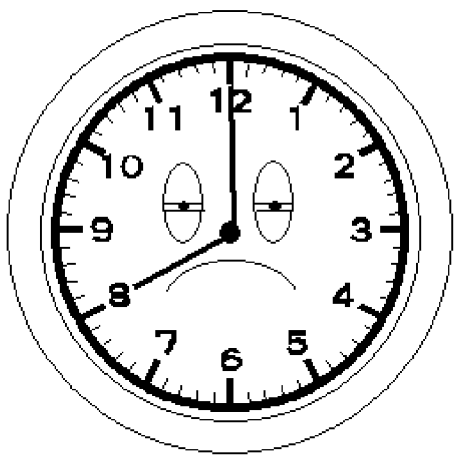
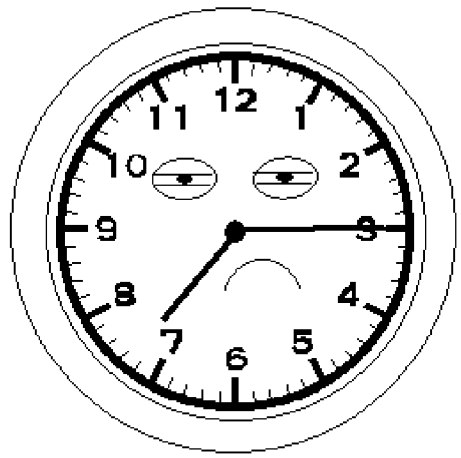
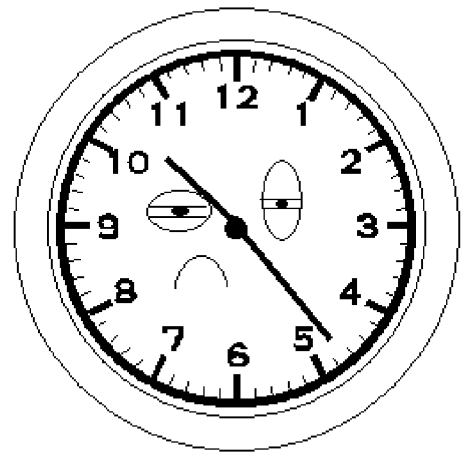

Fig. 17
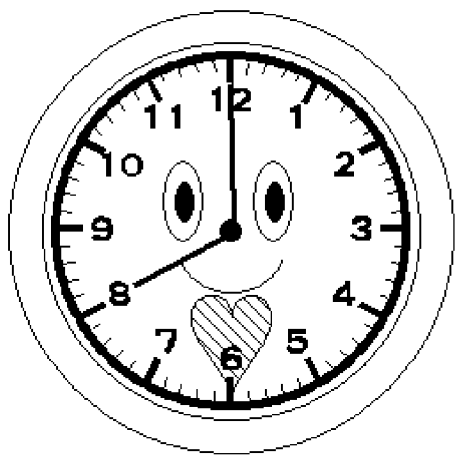
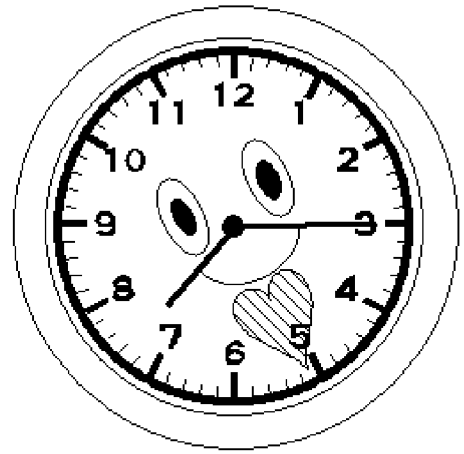
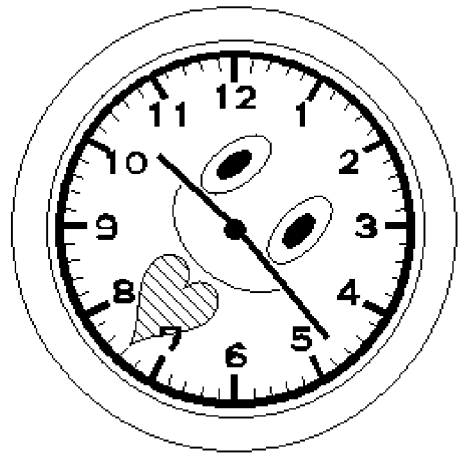

CLOCK WITH A CLOCK FACE FOR INDICATING TIME HAVING NEARLY FULL-SCREEN DISPLAY FUNCTION

BACKGROUND OF THE INVENTION

1. Field of the Invention

The present invention relates to a clock with a clock face for indicating time.

2. Description of the Related Art

Conventionally, irrespective of clock or watch type, a timepiece, which can display additional information other than time and date, is known.

For example, in Patent Reference 1, a digital clock, which can numerically display a current degree of achievement to a target value to be achieved within a certain period of time, is disclosed. Additionally, in Patent Reference 2, a countdown analog clock, which can numerically display remaining days to a predetermined target date, is disclosed.

CITED REFERENCES

Patent Reference 1: Japanese Unexamined Patent Application Publication No. 2009-85935
Patent Reference 2: Japanese Unexamined Patent Application Publication No. H8-226982

GENERAL DESCRIPTION OF THE INVENTION

Problems that the Invention Tries to Solve

However, in the above clock, it is difficult to instantly grasp the additional information upon looking at the time, and the information is not efficiently utilized. Moreover, since the additional information is displayed just by numerical value etc, it is not popular among people of all ages.

Means for Solving the Problems

In order to solve the above deficiencies, we provide a clock which comprises a clock face for indicating time, having a nearly full-screen display function and an outline appearing to be a face, a storage for facial expression information, storing a plurality of facial expression information displayable on the display, an acquisition unit for external information, acquiring external information, a storage for correspondence information, storing correspondence information for correlating the external information with the facial expression information, and a clock face controller, acquiring the facial expression information to be displayed on the display from the storage for facial expression information by utilizing the external information and the correspondence information, and displaying the information on the display.

Effects of the Invention

According to the present invention having the above configuration, it is possible to grasp additional information when casually looking at a clock, thereby increasing the frequency of utilization of the information. Moreover, it is possible to display additional information by the facial expression displayed on the clock face appearing to be a face, so that a user can feel that he is facing to a person when looking at the clock and have a sense of familiarity with the clock.

BRIEF DESCRIPTION OF THE DRAWINGS

FIG. 3 is a diagram showing an example of correspondence information.
FIG. 4 is a diagram showing another example of correspondence information.
FIG. 5. is a diagram showing an example of a configuration of the clock of the first embodiment.
FIG. 9 shows a concept of a clock of a second embodiment.
FIG. 11 is a diagram showing table information for correlating result of comparative calculation with facial expression information.
FIG. 13 shows a concept of a clock of a third embodiment.
FIG. 16 is a diagram showing an example of a configuration of the clock of the third embodiment.
FIG. 17 is a diagram showing another example of a configuration of the clock of the third embodiment.

DETAILED DESCRIPTION OF THE INVENTION

Embodiments of the present invention will be described hereinbelow. Relationship between embodiments and claims is as follows. The first embodiment will mainly describe claims 1, 3, 5, 6, 7, and 8. Moreover, the second embodiment will mainly describe claim 4. Moreover, the third embodiment will mainly describe claim 2. The present invention is not to be limited to the above embodiments and able to be embodied in various forms without departing from the scope thereof.

First Embodiment

Concept of First Embodiment

Figure 1:
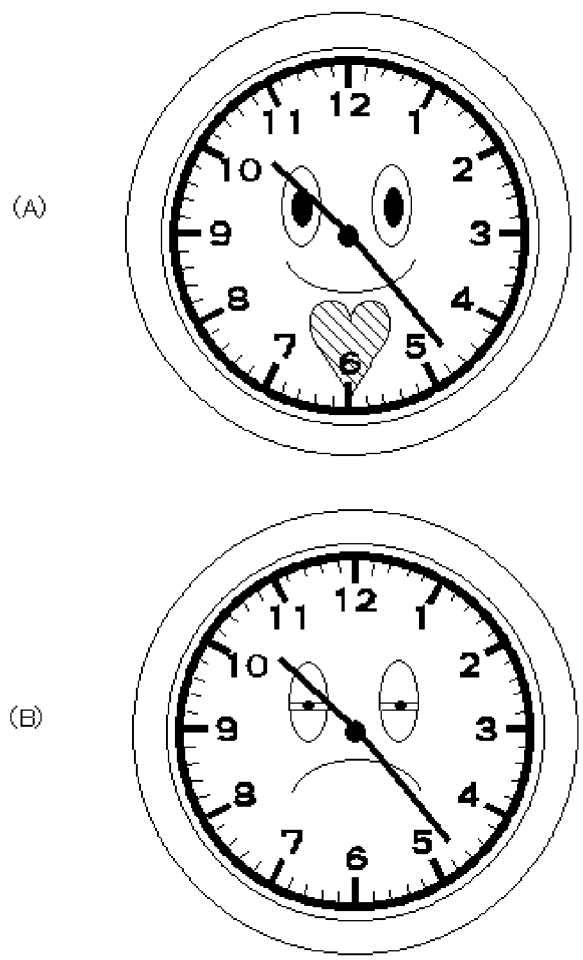
FIG. 1 shows a concept of a clock of a first embodiment.

FIG. 1 shows a concept of a clock of a first embodiment. As shown in FIG. 1, the clock of the first embodiment has a configuration enabling display of the additional information by facial expressions displayed on a nearly-full screen of the clock face for indicating time having the shape of a face. In FIG. 1, when the additional information indicates good information (e.g., playing time of video game is short), a happy face is displayed on the clock face (A), and when the additional information indicates bad information (e.g., playing time of video game is long), a stunned face is displayed on the clock face (B). According to the above configuration, it is possible to grasp the additional information when casually looking at a clock. Moreover, a user can have a sense that he faces to a person when looking at the clock and feel familiarity with the clock.

Configuration of First Embodiment

Figure 2:
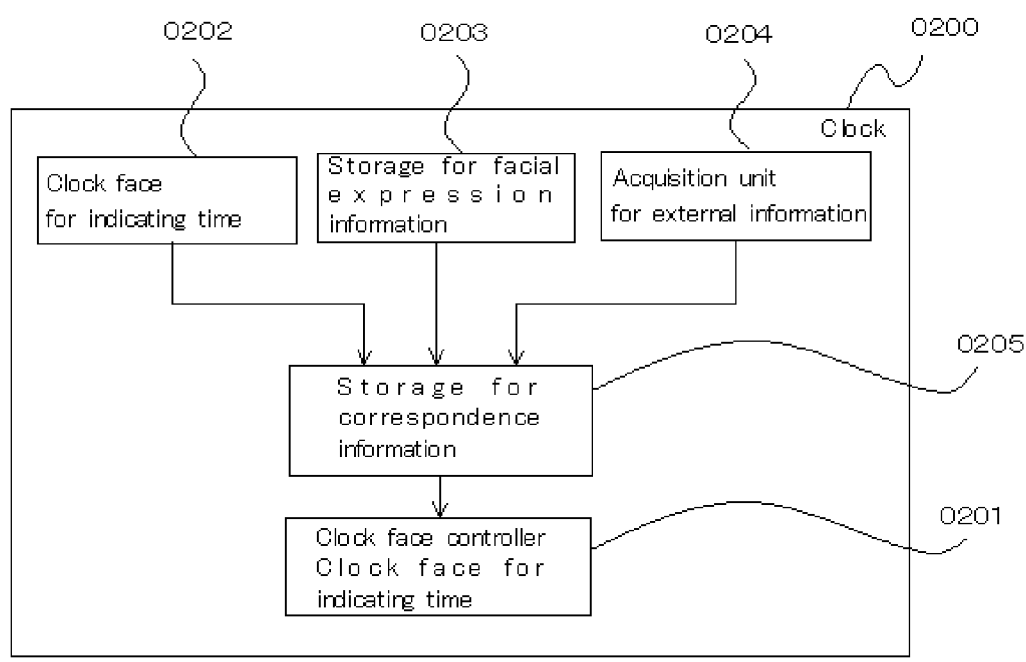
FIG. 2 is a diagram exemplifying a functional block diagram of the clock of the first embodiment.

FIG. 2 is a diagram exemplifying a functional block diagram of the clock of the first embodiment. As shown in FIG. 2, a 'clock' 0200 comprises a 'clock face for indicating time' 0201, a 'storage for facial expression information' 0202, an 'acquisition unit for external information' 0203, a 'storage for correspondence information' 0204, and a 'clock face controller' 0205. Note that the clock of the present invention may be a wall clock, a table clock or a watch (the same applies to the following embodiments).

The functional block of the apparatus can be implemented by hardware, software, or both hardware and software. Moreover, this invention can be implemented not only as an apparatus but also as a method.

Moreover, a portion of such inventions may be configured as software. Furthermore, a software product used for causing a computer to execute the software, and the recording medium, in which the software is installed, should be included in the technical scope of the present invention (the same applies throughout the entire specification).

The 'clock face for indicating time' has a nearly full-screen display function and an outline appearing to be a face. Here, in the clock face for indicating time', characters (e.g., Arabic numerals, Roman numerals, or Chinese numerals), symbols and graduation for indicating time are arranged. Therefore, the clock of the present invention displays time in an analog format. Note that the characters, symbols and graduation for indicating time may be displayed through output by the display function, or may be preliminarily printed on a surface of the clock face, or may be expressed by concavity and convexity on a flat surface of the clock face.

The display function is concretely configured, for example, by LED elements and LED driver for driving the LED elements. In this case, the LED elements may be a plurality of elements having colors such as red, green and blue, or monochromatic elements. Moreover, the display may be configured by an LCD display (liquid crystal display), a CRT display, a plasma display, and is not limited to any one of the examples.

The terms 'an outline of clock face for indicating time appears to be a face' means that the clock face for indicating time has a shape similar to that of an outline of a face. Examples of the outline of the face may include an outline of a human face, an animal, an insect, and a cartoon character. Moreover, these outlines of faces may be expressed in various manners using a shape similar to basic graphic such as a circle, an ellipse, a polygon or a star, or using a complicated shape particularly imitating an outline of a human face or an animal face etc. Moreover, the outline of clock face for indicating time may not be the same as the outline of the clock. For example, a configuration, where the outline of clock face for indicating time is a circular shape and the outline of the clock is a square shape, may be used.

The 'storage for facial expression information' has a function of storing a plurality of facial expression information displayable on the display. Here, as shown in FIG. 1, examples of the plurality of facial expression information include the facial expression information of a happy face or a stunned face. Additionally, examples of the plurality of facial expression information include the facial expression information of a cheerful face or a tired face, the facial expression information of a face looking well or a face looking pale, the facial expression information of a sneezing face or a yawning face, the facial expression information of a face when feeling hot or a face when feeling cold, the facial expression information of a face when being proud or a face when feeling embarrassed, and the facial expression information of a face when showing respect or a face when showing disrespect. Note that these faces may not be a human face, and may be an animal or a cartoon character.

The facial expression information may be stored as information of an entire face, or segmentalized information of each portion of a face forming the facial expression (e.g., information of each portion such as eye, nose, mouth, ear, eyebrow, and information of position and color etc. of each portion). Moreover, the facial expression information may be graphics information (including three-dimensional graphics information) or photographic information.

The storage for facial expression information is concretely configured by using a storage device such as a nonvolatile memory. The facial expression information is preliminarily stored in the storage device, and modification and addition to the information may be carried out when accepting or receiving input of new facial expression information.

The 'acquisition unit for external information' has a function of acquiring external information. Examples of the external information include information indicating status of use of energy such as electricity, gas or water, information of temperature (outside or inside air), humidity (outside or inside air), amount of solar radiation, wind speed, amount of precipitation, snow accumulation, precipitation probability, and warning etc. earthquake information, typhoon information, and emergency evacuation information. Such information can be acquired from a measuring sensor, a storage device storing data of the measuring sensor, or a specific server etc. via a network. Moreover, a configuration for accepting such information via operation input device may be used.

Other examples of the external information include viewing time or playing time of video game, which are acquired from a viewer device or a video game player device, information of operation mode, operation time, and error etc, which are acquired from home appliances, information of bath temperature, and status of heating water, which are acquired from a water heater etc, and information of electric power consumption, electric power for sale, electric power for purchase, electric power storage, and electric power generation per predetermined period of time (including unit of time), which are acquired from a power management unit or a power generation unit.

In addition to the information acquired from the external device etc, information newly generated by internal processing using the information acquired from the external device etc. is included in the external information. An example of such external information includes calculation result information acquired through calculation by comparing the information of the viewing time acquired from the external device etc. with the information of the target time stored in the internal storage area.

Moreover, the external information may not be one type, and a plurality of types of external information may be acquired. For example, the information of viewing time may be acquired from the viewing device etc. and at the same time, information of operation time of an air conditioner etc. may be acquired from an air conditioner.

The storage for external information is concretely configured by a processing unit such as a CPU or an MPU etc, program for receiving the external information, interface (communication interface, and interface for the external storage device, measuring device and operation input device), storage device (including volatile memory etc) for storing the external information etc. The acquired external information may be temporarily stored in RAM etc., or may be stored for long periods in a nonvolatile memory etc.

The 'storage for correspondence information' has a function of storing correspondence information for correlating the external information with the facial expression information. FIG. 3 is a diagram showing an example of correspondence information. In FIG. 3, the temperature (outside or inside) with the facial expression information of a face when feeling hot and a face when feeling cold are correlated. Specifically, the temperature range over 40 degrees Celsius and the facial expression information showing a face when feeling extremely hot, the temperature range 30 to 40 degrees Celsius and the facial expression information showing a face when feeling slightly hot, the temperature range 15 to 30 degrees Celsius and the facial expression information showing a face when feeling not too hot and not too cold, the temperature range 0 to 15 degrees Celsius and the facial expression information showing a face when feeling slightly cold, and the temperature range under 0 degrees Celsius and the facial expression information showing a face when feeling extremely cold are respectively correlated. This configuration enables instinctive understanding of temperature through the facial expression information displayed on the clock face for indicating time of the clock.

Moreover, viewing time (viewing time per predetermined period of time in the past or continuous viewing time etc.) of a viewing device in a specific room (e.g., child's room) and the facial expression information showing an admiring face or a stunned face may be correlated. Specifically, information indicating that the viewing time exceeds 2 hours of the past 3 hours and the facial expression information showing an extremely stunned face, information indicating that the viewing time is 1 to 2 hours of the past 3 hours and the facial expression information showing a slightly stunned face, information indicating that the viewing time is half an hour to an hour of the past 3 hours and the facial expression information showing a face, not admiring nor stunned, and information indicating that the viewing time is under half an hour in the past 3 hours and the facial expression information showing an extremely admiring face are respectively correlated. This configuration enables instinctive understanding of viewing time of a specific viewing device through the facial expression information displayed on the clock face for indicating time of the clock.

The 'clock face controller' has a function of acquiring the facial expression information to be displayed on the display from the storage for facial expression information by utilizing the external information and the correspondence information, and of displaying the information on the display. Here, timing of displaying on the display and display time may variously exist and may be accordingly set. For example, a configuration for constantly displaying or a configuration for displaying for a minute every an hour may be used. In addition, a configuration for varying display timing and display time for the respective facial expression information displayed on the display may be used. For example, when the facial expression information showing an alarmed look is outputted, if an operation to confirm details is received, the output of the facial expression showing an alarmed look is terminated.

The clock face controller is concretely configured by a processing unit such as a CPU or an MPU etc, a controller for display signal to control display (e.g., a controller for LED signal having a function of converting image signal to LED display signal and distributing the signal to an LED display driver).

As to processes to acquire the facial expression information and to display it on the display, processes for working and modifying the facial expression information according to size or shape of the display may be included. Specifically, when the facial expression information is separated into information of respective facial parts (e.g., information of type and information of position of respective facial parts such as an eye, a nose, a mouth and an eyebrow), a configuration for combining the respective facial parts based on the external information and on the correspondence information, and for outputting it to the display may be used.

FIG. 4 is a diagram showing another example of correspondence information. As shown in FIG. 4, the correspondence information includes the information of type (LE1 etc.) and the information of position (($X_{LE}1, Y_{LE}1$) etc.) of the respective facial parts correlated with the external information (IN1 etc.). The clock face controller acquire the facial expression information of the respective facial parts correlated with the acquired external information based on the correspondence information from the storage for facial expression information, and display them at the appropriate positions on the display.

Additionally, a controller section for characters, varying more than one of position, tilt, color and shape of characters indicating the time of the clock face for indicating time, corresponding to the facial expression information indicated on the display, may be used.

FIG. 5 is a diagram showing an example of a configuration of the clock of the first embodiment. As shown in FIG. 5, when facial expression showing good information (e.g., cheerful facial expression), characters indicating each time are normally arranged, and when facial expression showing bad information (e.g., dark facial expression), characters indicating each time are arranged such that they are inclined at varying angles. This configuration can be implemented by a driving motor and a driving program for varying positions or tilts of parts, on which predetermined characters configuring the clock face are printed etc. In addition, a configuration, in which characters etc. for indicating each time are displayed by display function, can be implemented by a program or table information, in which information of positions and tilts of characters etc. for indicating each time and the facial expression information are correlated.

Moreover, a configuration, in which when facial expression showing good information (e.g., cheerful facial expression), characters etc. indicating each time have bright colors or good shapes, and when facial expression showing bad information (e.g., dark facial expression), characters etc. indicating each time have dark colors or distorted shapes, can be used. This configuration can be implemented by program or table information, in which information of colors and shapes of characters etc. for indicating each time and the facial expression information are correlated.

Note that the above clock face controller may comprise a display section for external information displaying the facial expression information and the external information on the display. This configuration makes it possible to intuitively understand the external information by the facial expression information, and at the same time, to confirm the external information itself as necessary. It is preferable that the external information is displayed on an area, in which the facial expression information is not displayed, or an area that has an insignificant effect on the confirmation of details of the facial expression information (e.g., an area between nose and mouth, an area between eyes, or an area near forehead).

Moreover, different from the above configuration, a configuration that comprises a voice output unit capable of voice, a storage for voice information storing a plurality of voice information that can be outputted from the voice output unit, a storage for voice correspondence information storing voice correspondence information, in which external information and the voice information are correlated, and a controller for voice output acquiring the voice information to be outputted from the voice output unit by utilizing the acquired external information and the voice correspondence information from the storage for voice information, and outputting the information, can be used. Here, timing of outputting voice is controlled so as to be synchronized with the output of display of the facial expression information. For example, the facial expression information showing a happy look and the voice information expressing a happy mood may be simultaneously outputted.

Figure 19:
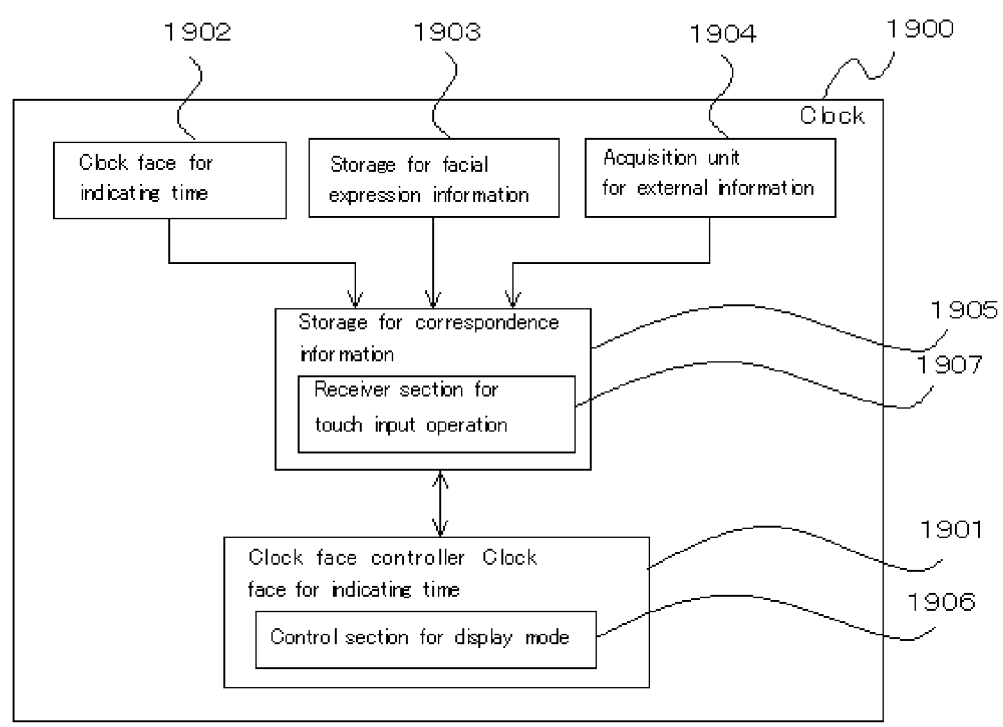
FIG. 19 is a diagram showing another functional block diagram of the clock of the first embodiment.

Moreover, the clock face for indicating time may comprise a receiver section for touch input operation, receiving a touch input operation to the facial expression information displayed on the display, and the clock face controller may comprise a control section for display mode, controlling display mode of the facial expression information in response to the touch input operation to the facial expression information. For example, a touch operation to rotate the facial expression information displayed on the display in a clockwise or anti-clockwise direction (sliding operation to rotate etc.) may be received, or a touch operation to zoom entire or partial facial expression information (sliding operation to zoom etc.) may be received. FIG. 19 is a diagram showing another functional block diagram of the clock of the first embodiment.

Figure 20:
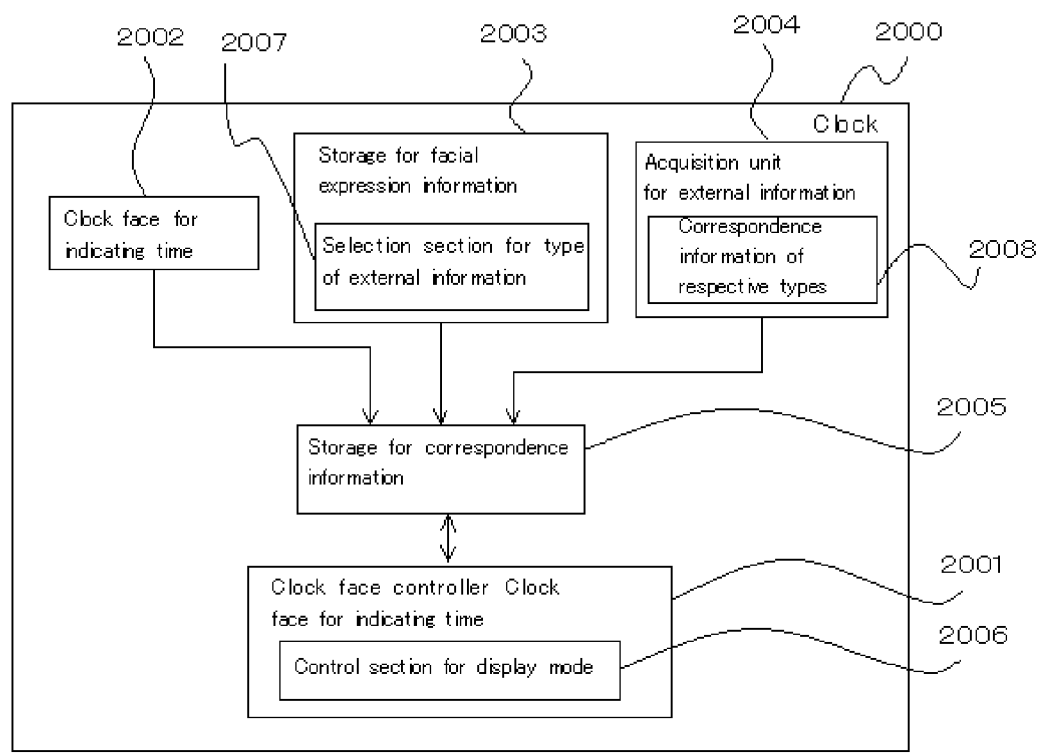
FIG. 20 is a diagram showing another functional block diagram of the clock of the first embodiment.

Moreover, the acquisition unit for external information may comprise a selection section for type of external information that selects a type of the external information, acquired by the acquisition unit for external information, in response to the touch input operation to the facial expression information displayed on the display. For example, when receiving an operation input of touching to an eye of the facial expression information displayed on the display, information of viewing time of the viewing device (including playing time of a video game device) is acquired, when receiving an operation input of touching the mouth of the facial expression information, information of continuous talk time is acquired from telephone device etc, and when receiving an operation input of touching to an ear of the facial expression information, information of charging is acquired from a portable audio device etc. In this case, the storage for correspondence information comprises a storage section for correspondence information of respective types that stores correspondence information of respective types, indicating correspondence between the external information and the facial expression information with respect to each type of the external information. FIG. 20 is a diagram showing another functional block diagram of the clock of the first embodiment. In addition, setting of the selection section for type of external information and details of the storage section for correspondence information of respective types may be accordingly varied, and the external information to be acquired and corresponding facial expression information may be selected.

Figure 21:
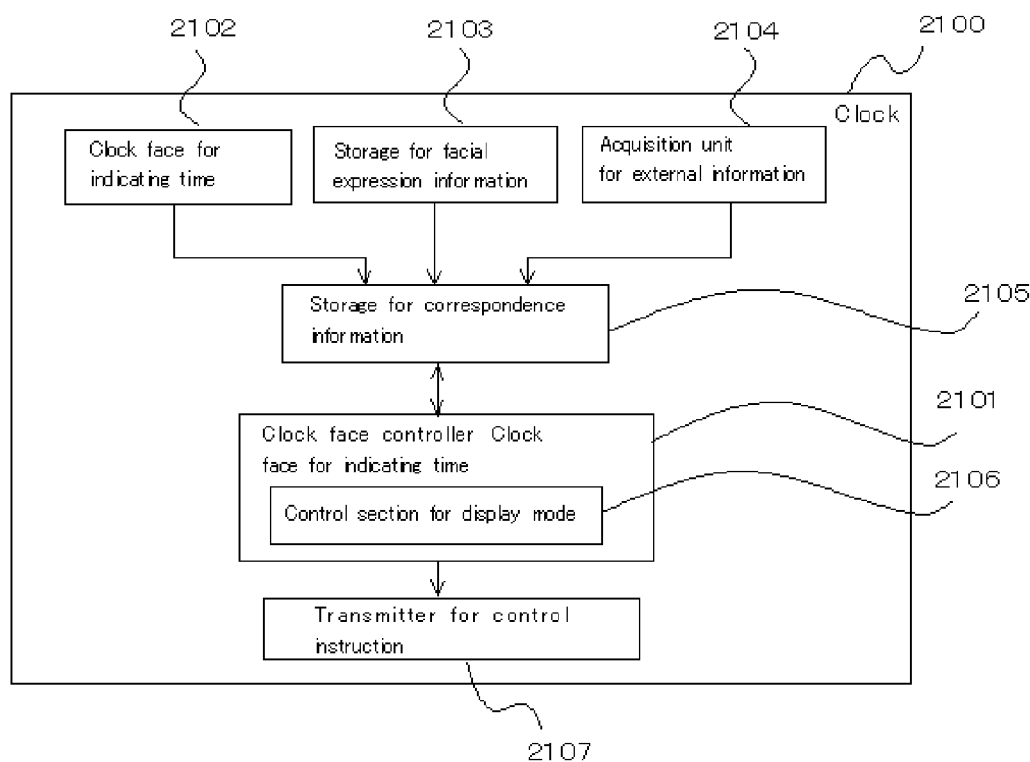
FIG. 21 is a diagram showing another functional block diagram of the clock of the first embodiment.

Moreover, the clock of the first embodiment may comprise a transmitter for control instruction that transmits a control instruction to an electric device connected via wired or wireless network in response to the reception of the touch input operation, concerning the facial expression information, to the facial expression information displayed on the display. Specifically, if the clock is connected with an air conditioner via the network, when receiving a predetermined touch input operation to a facial expression displayed on the display, a control instruction to change mode of the air conditioner is transmitted to the air conditioner (e.g., when receiving an operation to wipe the sweat from a facial expression showing a sweaty face, an instruction to decrease the temperature to a predetermined level is transmitted to the air conditioner, or when receiving an operation to rub a facial expression showing a face feeling cold and shivering, an instruction to raise the temperature to a predetermined level is transmitted to the air conditioner). FIG. 21 is a diagram showing another functional block diagram of the clock of the first embodiment.

Figure 6:
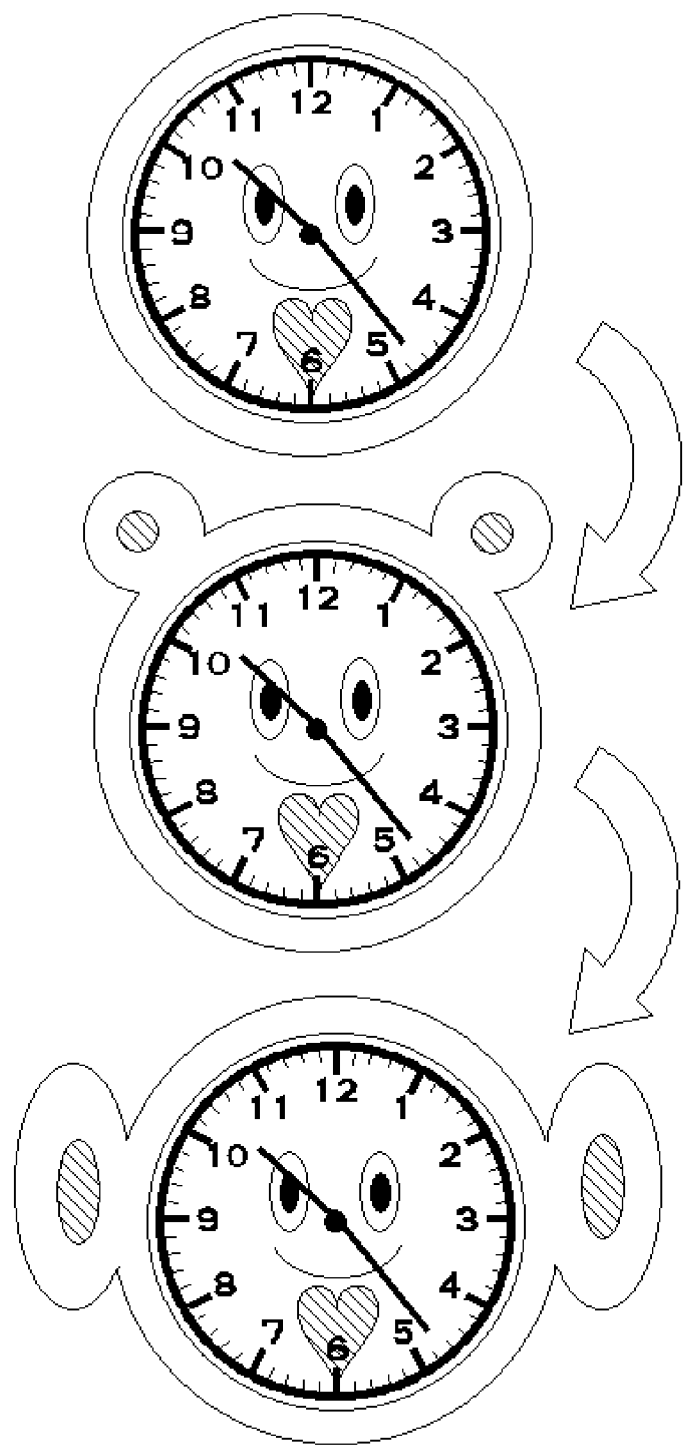
FIG. 6. is a diagram showing another example of a configuration of the clock of the first embodiment.

Moreover, a part of the outline of the clock may be detached and changed to other. For example, as shown in FIG. 6, a part of the outline of the clock may be detached and changed so as to be a bear or monkey.

Concrete Configuration of First Embodiment

Figure 7:
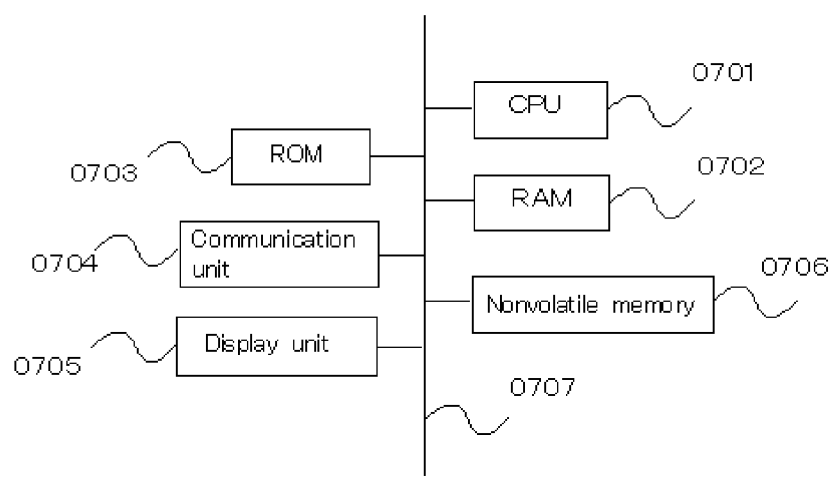
FIG. 7 is a diagram exemplifying a hardware configuration of the clock of the first embodiment.

FIG. 7 is a diagram exemplifying the above functional components of the clock as a hardware configuration. A description of the hardware configuration is provided with reference to FIG. 7.

As shown in FIG. 7, the clock comprises a 'CPU' 0701, a 'RAM' 0702, a 'ROM' 0703, a 'communication unit' 0704, a 'display unit' 0705, and a 'nonvolatile memory (e.g., flash memory)' 0706. These components are connected with each other via a data communication path of a 'system bus' 0707, thereby carrying out processing and transmission/reception of information.

The CPU carries out processing to acquire the external information via the communication unit, and to store the information in the RAM. Here, it is possible to store the information in the nonvolatile memory. Subsequently, the correspondence information stored in the ROM or the flash memory is read out to the RAM. Subsequently, processing to determine the facial expression information to be displayed on the display based on the external information stored in the RAM and the correspondence information. Subsequently, the determined facial expression information is read out from the ROM or the flash memory and is stored in the RAM. Subsequently, the read-out facial expression information is outputted to the display unit.

Note that the communication unit receives data from a measuring sensor in local area or data from storage device for storing the data from the measuring sensor, or data from a server etc. outside the local area.

Processing Flow of First Embodiment

Figure 8:
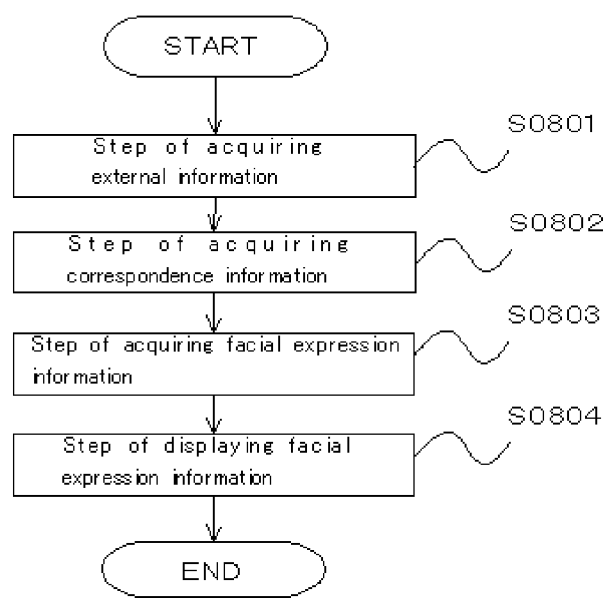
FIG. 8 is a flowchart of processes in the clock of the first embodiment.

FIG. 8 is a flowchart of processes in the clock with a clock face for indicating time, having a nearly full-screen display function and an outline appearing to be a face of the first embodiment. The processes comprise the following steps. At the outset, in step S0801, the external information is acquired (step of acquiring external information). Subsequently, in step S0802, correspondence information for correlating the external information with the plurality of facial expression information displayable on the display is acquired (step of acquiring correspondence information). Subsequently, in step S0803, facial expression information to be displayed on the display is acquired by utilizing the external information acquired in the step of acquiring external information and the correspondence information acquired in the step of acquiring correspondence information (step of acquiring facial expression information). Subsequently, in step S0804, the facial expression information acquired in the step of acquiring facial expression information is displayed on the display (step of displaying facial expression information).

Brief Description of Effects of First Embodiment

According to the clock of the first embodiment, it is possible to grasp the additional information when casually watching a clock. Moreover, a user can have a sense that he faces a person when watching the clock and feel familiarity with the clock.

Second Embodiment

Concept of Second Embodiment

As shown in FIG. 9, the clock of the second embodiment has a configuration enabling display of a result of comparing a target value for energy use with a measured value of energy use by facial expressions displayed on nearly-full screen of the clock face for indicating time having a shape of a face. According to this configuration, it is possible to grasp the additional information when casually watching a clock. Moreover, a user can have a sense that he faces to a person when watching the clock and feel familiarity with the clock.

Configuration of Second Embodiment

Figure 10:
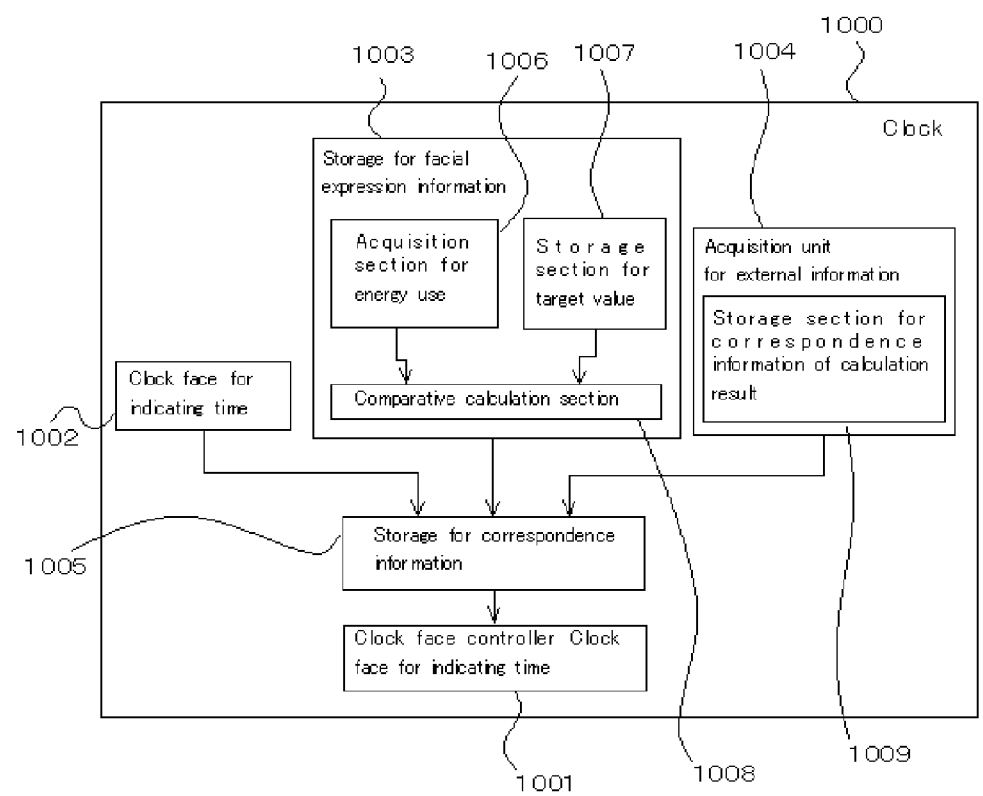
FIG. 10 is a diagram exemplifying a functional block diagram of the clock of the second embodiment.

FIG. 10 is a diagram exemplifying a functional block diagram of the clock of the second embodiment. As shown in FIG. 10, a 'clock' 1000 comprises a 'clock face for indicating time' 1001, a 'storage for facial expression information' 1002, an 'acquisition unit for external information' 1003, a 'storage for correspondence information' 1004, and a 'clock face controller' 1005. The 'acquisition unit for external information' comprises an 'acquisition section for energy use' 1006, a 'storage section for target value' 1007, and a 'comparative calculation section' 1008. The 'storage for correspondence information' comprises a 'storage section for correspondence information for calculation result' 1009. The basic configuration is the same as that of the clock of the first embodiment, so that the descriptions of the 'acquisition section for energy use' 1006, the 'storage section for target value' 1007, the 'comparative calculation section' 1008, and the 'storage section for correspondence information for calculation result' 1009, which differ from the first embodiment, will be provided.

The 'acquisition section for energy use' has a function of acquiring energy use such as electricity, gas and water. Here, the energy use such as electricity, gas and water may include energy use of liquid fuel (e.g., oil) and solid fuel (e.g., coal) in addition to the energy use of electricity, gas and water.

As the energy use, energy use per predetermined period of time is assumed. For example, energy use per second, hour, day, or month may be used.

The energy use may be acquired from a measuring device for measuring energy use, from a storage device for energy use storing energy use data, from a server existing in the external network, or by input received through an operation input device.

The acquisition section for energy use is concretely configured by processing unit such as a CPU or an MPU etc, program for receiving the external information, interface (communication interface, and interface for the external storage device, measuring device and operation input device), storage device (including volatile memory etc) for storing the external information etc. The acquired external information may be temporarily stored in RAM etc., or may be stored for long periods in a nonvolatile memory etc.

The 'storage section for target value' has a function of storing a target value for energy use. Examples of the target value for energy use include a target value for energy use per predetermined period of times such as half an hour, day, month, or year. These target values may not be fixed values, and may be variable values, which vary depending on time or date. For example, a target value for energy use from 12:00 to 12:30 may be different from a target value for energy use from 12:30 to 13:00.

As the configuration to store the target value for energy use, table information, in which the target value is correlated with respect to each time zone, day, or season, or a program for calculating the target value by receiving the time zone, day, or season as variables may be used.

Moreover, the above table and program may not be fixed form, and may be variable form. For example, in the case of the table information, in which the target value is correlated with respect to each time zone, day, or season, when the target value for a predetermined time zone of a predetermined day in a certain season is achieved (the measured value of energy use is less than the target value), a new target value for energy use may be set based on the measured value of energy use at the point of achievement.

Moreover, it is possible to acquire energy use data of days of similar environmental conditions such as external temperature and humidity from data stored in the nonvolatile memory etc, and to set the energy use value per time zone of the day, whose energy use value is smallest, as target value for energy use per time zone.

In addition, it is possible to accordingly acquire the target value data from a storage device for energy use existing in the local area network, or to acquire the data from server etc. in the external network, and to store the data.

The 'comparative calculation section' has a function of carrying out comparative calculation of the target value for the energy use and the energy use acquired by the acquisition section for energy use. Therefore, the section calculates the difference between the measured value and the target value, and calculates the ratio of the measured value to the target value, thereby comparing the measured value with the target value. The comparative calculation section is concretely configured by a processing unit such as a CPU or a MPU etc. and a RAM etc.

The 'storage section for correspondence information for calculation result' has a function of storing correspondence information for calculation result, indicating correspondence between the comparative calculation result and the facial expression information. As the correspondence information for calculation result indicating correspondence between the comparative calculation result and the facial expression information, table information for correlating the comparative calculation result and the facial expression information is mainly used.

FIG. 11 is a diagram showing table information for correlating result of comparative calculation with facial expression information. In FIG. 11, the correlating result of comparative calculation, where a ratio of the measured value to the target value is above 1.5, and the facial expression information showing a face deeply disappointed, the correlating result of comparative calculation, where a ratio of the measured value to the target value is 1 to 1.5, and the facial expression information showing a face slightly disappointed, and the correlating result of comparative calculation, where a ratio of the measured value to the target value is below 1, and the facial expression information showing a happy face are respectively correlated.

Concrete Configuration of Second Embodiment

The hardware configuration of the clock of the second embodiment is basically the same as that of the first embodiment described with reference to FIG. 7. Hereinafter, descriptions of characteristic processes of the clock of the second embodiment will be provided.

The CPU carries out processing to acquire the energy use data via the communication unit, and to store the data in the RAM. Here, it is possible to store the data in the nonvolatile memory. Subsequently, the target value for energy use stored in the ROM or the flash memory is stored in the RAM. Subsequently, the comparative calculation or the measured value and the target value based on the energy use data and the target value data is carried out, and the calculation result is stored in the RAM. Subsequently, the correspondence information for calculation result, indicating correspondence between the comparative calculation result stored in the ROM or the flash memory and the facial expression information, is stored in the RAM. Subsequently, processing to determine the facial expression information to be displayed on the display based on the result of comparative calculation and the correspondence information for calculation result, which are stored in the RAM. Subsequently, the determined facial expression information is read out from the ROM or the flash memory to the RAM. Subsequently, the read-out facial expression information is outputted to the display unit.

Note that the communication unit receives data from a measuring sensor in local area or data from storage device for storing the data from the measuring sensor, or data from a server etc. outside the local area.

Processing Flow of Second Embodiment

Figure 12:
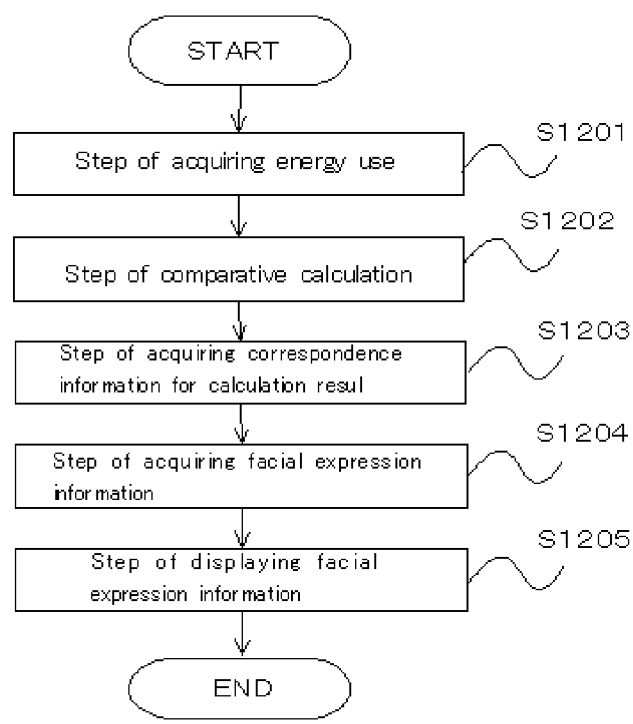
FIG. 12 is a flowchart of processes in the clock of the second embodiment.

FIG. 12 is a flowchart of processes in the clock with a clock face for indicating time, having a nearly full-screen display function and an outline appearing to be a face of the second embodiment. The processes comprise the following steps. At the outset, in step S1201, the energy use such as electricity, gas and water is acquired (step of acquiring energy use). Subsequently, in step S1202, comparative calculation of the target value for energy use and the measured energy use acquired by the acquisition section for energy use is carried out (step of comparative calculation). Subsequently, in step S1203, correspondence information for calculation result, indicating correspondence between the comparative calculation result and the facial expression information, is acquired (step of acquiring correspondence information for calculation result). Subsequently, in step S1204, facial expression information to be displayed on the display is acquired by utilizing the comparative calculation result acquired in the step of comparative calculation and the correspondence information for calculation result acquired in the step of acquiring correspondence information for calculation result (step of acquiring facial expression information). Subsequently, in step S1205, the facial expression information acquired in the step of acquiring facial expression information is displayed on the display (step of displaying facial expression information).

Brief Description of Effects of Second Embodiment

According to the clock of the second embodiment, it is possible to grasp the information concerning the energy use when casually looking at a clock. Moreover, a user can have a sense that he faces to a person when looking at the clock and feel familiarity with the clock.

Third Embodiment

Concept of Third Embodiment

As shown in FIG. 13, the clock of the third embodiment has a configuration enabling display of additional information by facial expressions displayed on nearly-full screen of the clock face for indicating time having a shape of a face, and the type of face varies according to a position of a hand. According to this configuration, it is possible to grasp the additional information when casually looking at a clock. Moreover, a user can have a sense that he faces to a person when looking at the clock and feel familiarity with the clock.

Configuration of Third Embodiment

Figure 14:
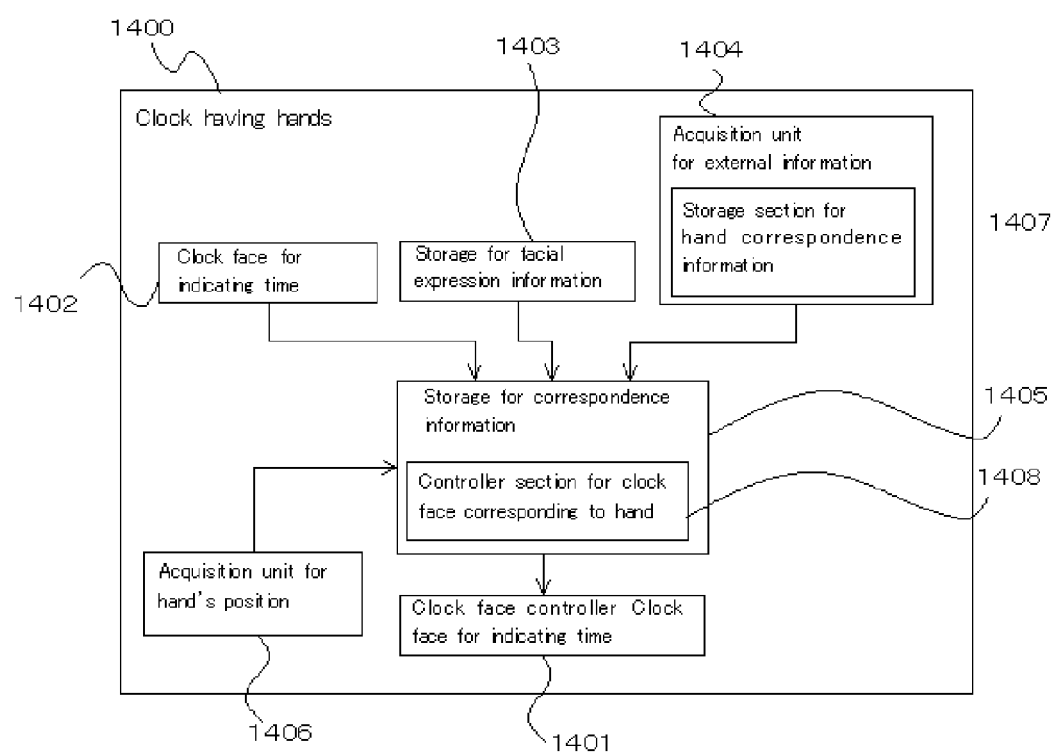
FIG. 14 is a diagram exemplifying a functional block diagram of the clock of the third embodiment.

FIG. 14 is a diagram exemplifying a functional block diagram of the clock of the third embodiment. As shown in FIG. 14, a 'clock' having a 'hand' 1400 comprises a 'clock face for indicating time' 1401, a 'storage for facial expression information' 1402, an 'acquisition unit for external information' 1403, a 'storage for correspondence information' 1404, a 'clock face controller' 1405, and an 'acquisition unit for hand's position' 1406. The 'storage for correspondence information' comprises a 'storage section for correspondence information for hand' 1407, and the 'clock face controller' comprises a 'controller section for clock face corresponding to hand' 1408. Hereinafter, descriptions of the 'acquisition unit for hand's position', the 'storage section for correspondence information for hand', and the 'controller section for clock face corresponding to hand', which are different from the first and second embodiments, will be provided.

The 'hand' has a function of indicating the time on the clock face for indicating time. As the hand, an hour hand, a minute hand and a second hand exist. A configuration where only the hour and minute hands are provided, or a configuration where all of the hour hand, minute hand and second hand are provided, may be used. Additionally, the hand may be displayed by the display function or may be a physical hand.

Figure 15:
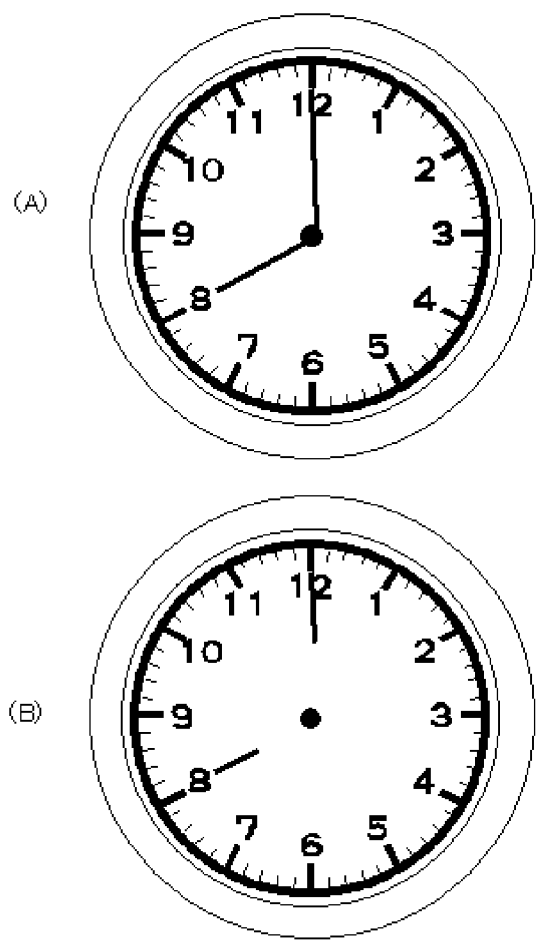
FIG. 15 is a diagram showing an example of the shape of hand of the clock.

The hand may have a form as shown in FIG. 15(A), where each hand extends from the center of the clock face to character or calibration etc. indicating time, or a form as shown in FIG. 15(B), where each hand extends from the position away from the center of the clock face to character or calibration etc. indicating time. Note that shape and arrangement of the hand are not limited to the above, and may have various forms.

The 'acquisition unit for hand's position' has a function of acquiring positional information of the hand. Examples of the positional information of hand include information indicating how many degrees the hand towards in a clockwise direction from the position of 0 o'clock in the clock face, or information indicating which direction indicated by calibration for time the hand towards. Moreover, the relative angle or difference of calibrations etc. between the hour hand, minute hand, and second hand may be acquired.

The positional information of hand may be acquired by calculating the elapsed time from a predetermined time (e.g., 0 o'clock) based on an internal clock of the processing unit such as a CPU, and by calculating the positional information of hand based on the elapsed time. Additionally, in the case of a clock (e.g., radio-controlled clock), whose time is set based on information externally acquired, the positional information of hand may be acquired based on the information externally acquired.

The 'storage section for correspondence information for hand' has a function of storing correspondence information for hand for correlating the external information, the positional information of hand, and the facial expression information. An example of the correspondence information for hand includes table information, where the external information, the positional information of hand, and the facial expression information are correlated.

FIG. 16 is a diagram showing that the facial expression displayed on the display varies according to hand's position. In FIG. 16, information indicting that continuous talking time is more than an hour and a stunned face are correlated, and according to positions of the hour and minute hands, the facial expression is segmentalized. According to this configuration, it is possible to prevent the hand from being an obstacle upon watching the facial expression, or from making facial expression of a different look. Therefore, it improves ability of coexistence with an analog-type clock.

Moreover, in the above example, a configuration, where the facial expression is segmentalized into a plurality of facial expressions according to positions of the hour and minute hands, is used, and a second hand may be added for segmentalization. Note that in the above example, the information of continuous talking time acquired as the external information may be acquired from a telephone device or a modem etc. connected with the telephone device.

The 'controller section for clock face corresponding to hand' has a function of acquiring the facial expression information to be displayed on the display from the storage for facial expression information by utilizing the external information, the positional information of hand and the correspondence information for hand, and displaying the information on the display.

The controller section for clock face corresponding to hand is concretely configured by a processing unit such as a CPU or an MPU etc, a controller for display signal to control display (e.g., a controller for LED signal having a function of converting image signal to LED display signal and distributing the signal to a LED display driver).

As processes to acquire the facial expression information and to display it on the display, processes for working and modifying the facial expression information according to size or shape of the display may be included. Specifically, when the facial expression information is separated into information of respective facial parts (e.g., information of type and information of position of respective facial parts such as an eye, a nose, a mouth and an eyebrow), a configuration for combining the respective facial parts, and for outputting it to the display may be used.

Moreover, it is possible to process and modify the facial expression information based on the positional information of hand. For example, after acquiring the facial expression information based on the external information, the positional information of hand, and the correspondence information for hand, as shown in FIG. 17, the facial expression information may be rotated based on the angle of the hour hand (or minute hand).

Concrete Configuration of Third Embodiment

The hardware configuration of the clock of the third embodiment is basically the same as that of the first embodiment described with reference to FIG. 7. Hereinafter, descriptions of characteristic processes of the clock of the third embodiment will be provided.

The CPU carries out processing to acquire the external information via the communication unit, and to store the information in the RAM. Here, it is possible to store the information in the nonvolatile memory. Subsequently, by utilizing the time information of the clock, the positional information of hand is calculated, and a calculation result is stored in the RAM. Subsequently, the correspondence information for hand stored in the ROM or the flash memory is read out to the RAM. Subsequently, processing to determine the facial expression information to be displayed on the display based on the external information, the positional information of hand, and the correspondence information for hand, which are stored in the RAM, is carried out. Subsequently, the determined facial expression information is read out from the ROM or the flash memory and is stored in the RAM. Subsequently, the read-out facial expression information is outputted to the display unit.

Note that the read-out facial expression information may be rotated based on the positional information of hand stored in the RAM, or the facial expression information may be zoomed or trimmed according to size or shape of the display, and the information may be outputted to the display.

Processing Flow of Third Embodiment

Figure 18:
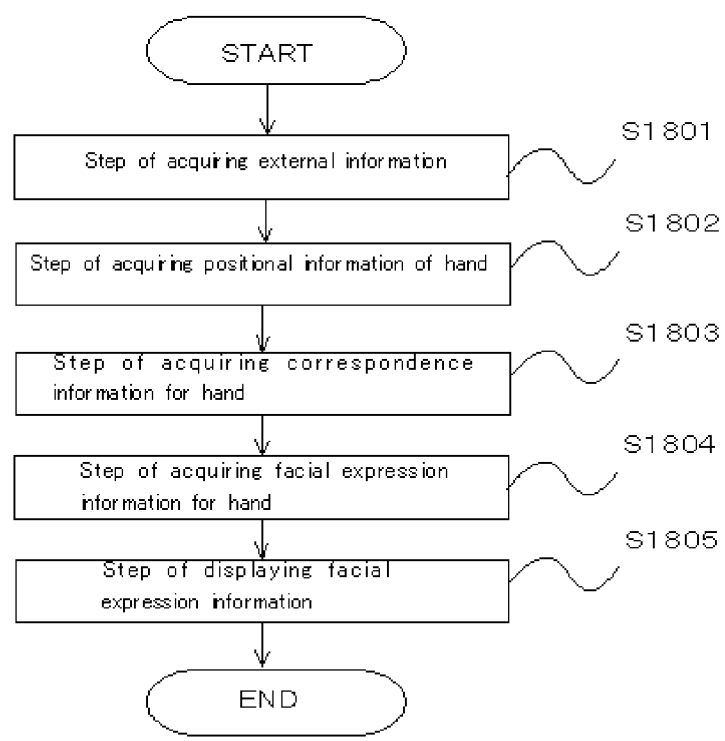
FIG. 18 is a flowchart of processes in the clock of the third embodiment.

FIG. 18 is a flowchart of processes in the clock with a clock face for indicating time, having a nearly full-screen display function and an outline appearing to be a face of the third embodiment. The processes comprise the following steps. At the outset, in step S1801, the external information is acquired (step of acquiring external information). Subsequently, in step S1802, the positional information of the hand is acquired (step of acquiring positional information of hand). Subsequently, in step S1803, the correspondence information for hand for correlating the external information, the positional information of hand, and a plurality of facial expression information displayable on the display is acquired (step of acquiring correspondence information for hand). Subsequently, in step S1804, facial expression information to be displayed on the display is acquired by utilizing the external information acquired in the step of acquiring external information, the positional information of hand acquired in the step of acquiring positional information of hand and the correspondence information for hand acquired in the step of acquiring had correspondence information (step of acquiring facial expression information for hand). Subsequently, in step S1805, the facial expression information acquired in the step of acquiring facial expression information relating to hand is displayed on the display (step of displaying facial expression information).

Brief Description of Effects of Third Embodiment

According to the clock of the third embodiment, it is possible to grasp the additional information when casually looking at a clock. Moreover, a user can have a sense that he faces to a person when looking at the clock and feel familiarity with the clock.

DESCRIPTION OF REFERENCE NUMERALS

0200 Clock
0201 Clock face for indicating time
0202 Storage for facial expression information
0203 Acquisition unit for external information 0204 Storage for correspondence information
0205 Clock face controller
1006 Acquisition section for energy use
1007 Storage section for target value
1008 Comparative calculation section
1009 Storage section for correspondence information for calculation result
1406 Acquisition unit for hand's position
1407 Storage section for correspondence information for hand
1408 Controller section for clock face corresponding to hand
1906 Receiver section for touch input operation
1907 Control section for display mode
2007 Selection section for type of external information
2008 Correspondence information of respective types
2107 Transmitter for control instruction
0701 CPU
0702 RAM
0703 ROM
0704 Communication unit
0705 Display unit
0706 Nonvolatile memory
0707 System bus

What is claimed is:

1. A clock, comprising:
a clock face having a nearly full-screen display, the nearly full-screen display comprising a time display and an animal-like or human-like facial expression display;
a facial expression storage unit, configured to store a plurality of facial expression information displayable on said animal-like or human-like facial expression display of said clock face;
an external information acquisition unit configured to acquire external information other than time information;
a correspondence storage unit configured to store correspondence information for correlating said external information with said facial expression information; and
a clock face controller configured to acquire the facial expression information to be displayed on said animal-like or human-like facial expression display of said clock face from said facial expression storage unit by utilizing said external information and said correspondence information, and configured to display the facial expression information on said animal-like or human-like facial expression display of said clock face.

2. The clock according to claim 1, further comprising:
a hand configured to indicate the time on said time display of said clock face; and
a hand position acquisition unit configured to acquire positional information of said hand,
wherein said correspondence storage unit comprises a storage section configured to store correspondence information for said hand for correlating said external information, said positional information of hand, and said facial expression information, and
said clock face controller comprises a controller section configured to acquire the facial expression information to be displayed on said animal-like or human-like facial expression display of said clock face from said facial expression storage unit by utilizing said external information, said hand's positional information and said correspondence information for hand, and configured to display the facial expression information on said animal-like or human-like facial expression display of said clock face.

3. The clock according to claim 1, wherein said clock face controller comprises a controller section for characters configured to vary more than one of position, tilt, color and shape of characters indicating the time of said clock face for indicating time, corresponding to the facial expression information indicated on said display.

4. The clock according to any one of claims 1 to 3, wherein said external information acquisition unit comprises:
an acquisition section configured to acquire energy use,
a storage section configured to store a target value for said energy use,
a comparative calculation section configured to carry out comparative calculation of said target value for said energy use and the energy use acquired by said acquisition section for energy use, and
wherein said correspondence storage comprises a storage section configured to store correspondence information for calculation results, and to indicate correspondence between said comparative calculation results and said facial expression information.

5. The clock according to any one of claims 1 to 3, wherein said clock face comprises:
a touch input receiver section configured to receive a touch input operation on said animal-like or human-like facial expression display of said clock face,
wherein said acquisition unit for external information comprises a selection section configured to select a type of external information acquired by said external information acquisition unit in response to the touch input operation on said animal-like or human-like facial expression display of said clock face, and
wherein said correspondence storage unit comprises a storage section configured to store correspondence information of respective types and to indicate correspondence between said external information and said facial expression information with respect to each type of said external information.

6. The clock according to any one of claims 1 to 3, wherein said clock face comprises:
a touch input receiver section configured to receive a touch input operation on said animal-like or human-like facial expression display of said clock face, and the clock comprising:
a transmitter configured to transmit a control instruction to an electric device connected via wired or wireless network in response to the reception of the touch input operation, concerning said facial expression information, to the facial expression information displayed on said display.

7. The clock according to any one of claims 1 to 3, wherein the clock face comprises:
a touch input receiver section configured to receive a touch input operation on said animal-like or human-like facial expression display of said clock face, and
wherein said clock face controller comprises a control section for display mode, controlling display mode of the facial expression information in response to the touch input operation.

8. The clock according to any one of claims 1 to 3, wherein said clock face controller comprises a display section for external information, displaying said external information along with said facial expression information on said animal-like or human-like facial expression display of said display.

9. The clock according to claim 1, wherein time information is displayed on said time display of said clock face in addition to facial expression information on said animal-like or human-like facial expression display of said clock face.

* * * * *